US006810409B1

(12) United States Patent
Fry et al.

(10) Patent No.: US 6,810,409 B1
(45) Date of Patent: Oct. 26, 2004

(54) COMMUNICATIONS NETWORK

(75) Inventors: Michael Fry, Killara (AU); Atanu Ghosh, Chippendale (AU)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/088,727

(22) Filed: Jun. 2, 1998

(51) Int. Cl.[7] .............................................. G06F 15/16
(52) U.S. Cl. ....................... 709/202; 709/217; 709/246
(58) Field of Search ............................... 395/200, 610; 380/49; 709/246, 201, 202, 203.217, 219, 228, 230, 236, 310, 311, 317

(56) References Cited

U.S. PATENT DOCUMENTS

| | | | | |
|---|---|---|---|---|
| 5,673,322 A | * | 9/1997 | Pepe et al. ..................... | 380/49 |
| 5,710,918 A | * | 1/1998 | Lagarde et al. ............. | 395/610 |
| 5,812,843 A | * | 9/1998 | Yamazaki et al. .......... | 395/670 |
| 5,826,025 A | * | 10/1998 | Gramlich ..................... | 395/200 |
| 5,918,018 A | * | 6/1999 | Gooderum et al. ......... | 395/200 |
| 5,961,601 A | * | 10/1999 | Iyengar ....................... | 709/229 |
| 6,065,120 A | * | 5/2000 | Laursen et al. ............. | 709/200 |
| 6,075,796 A | * | 6/2000 | Katseff et al. .............. | 370/466 |

FOREIGN PATENT DOCUMENTS

| | | |
|---|---|---|
| EP | 0259950 A1 | 3/1988 |
| EP | 0698876 A2 | 2/1996 |

OTHER PUBLICATIONS

Ozawa, "A 4.8 kb/s High–Quality Speech Coding Using Various Types of Excitation Signals", Proceedings of the European Conference on Speech Communication and Technology (Eurospeech), Paris, Sep. 26–28, 1989, vol. 1, Sep. 26, 1989, pp. 306–309.

McAulay et al, "19 Sine–wave Amplitude Coding at Low Data Rates", Advances in Speech Coding, Vancouver, Sep. 5–8, 1989, Jan. 1, 1991, pp. 203–213.

Arjmand et al, "Pitch–Congruent Baseband Speech Coding", Proceedings of ICASSP 83, IEEE International Conference on Acoustics, Speech and Signal Processing, Boston, MA, Apr. 14–16, 1983, 1983 New York, NY, IEEE USA, pp. 1324–1327, vol. 3.

Kleijn, "Continuous Representations in Linear Predictive Coding", IEEE, 1991.

Kleijn et al, "A General Waveform–Interpolation Structure for Speech Coding", Signal Processing, pp. 1665–1668, 1994.

Kleijn et al, "A Speech Coder Based on Decomposition of Characteristic Waveforms", 1995 IEEE, pp. 508–511.

McAulay et al, "Speech Analysis/Synthesis Based on a Sinusoidal Representation", IEEE Transactions on Acoustics, Speech and Signal Processing, vol. ASSP–34, No. 4, Aug. 1986, pp. 744–754.

Rosenberg, "Effect of Glottal Pulse Shape on the Quality of Natural Vowels", The Journal of the Acoustical Society of America, pp. 583–590, Apr. 1970.

Alexander et al, "Active Bridgin", SIGCOMM, vol. 27, No. 4, pp. 101–111, Oct. 1997.

Tennenhouse et al, "Towards AN Active Network Architecture", Computer Communications Review, vol. 26, No. 2, pp. 5–18.

Hardman et al, "Successful Multiparty Audio Communication", Communications of the ACM, vol. 41, No. 5, pp. 74–80, May 1998.

Ghosh et al, "JavaRadio: An Application Level Active Network", published at HIPPARCH '97, Jun. 3, 1997.

Casner, "First IETF Internet Audiocast", ACM Computer Communication Review, vol. 22, pp 92–97, Jul. 1992.

* cited by examiner

Primary Examiner—Paul H. Kang
(74) Attorney, Agent, or Firm—Nixon & Vanderhye P.C.

(57) ABSTRACT

Data is transmitted from a first server computer to a client computer by transmitting the data from the first server computer to a second server computer in a first encoding format, transforming the data from the first encoding format to a second encoding format at the second server computer and transmitting the transformed data in the second encoding format to the client computer from the second server computer.

11 Claims, 3 Drawing Sheets

COMMUNICATIONS NETWORK

BACKGROUND OF THE INVENTION

1. Field of the Invention

This invention relates to a method of communicating between two computers over a communications network.

2. Related Art

It is well known that the Internet is a global communications network which is used to connect a very large number of computers, with the Internet protocol (IP) being used to control communication between computers that use different network technologies (e.g. Ethernet, ISDN, ATM, etc.). One of the most commonly used applications on the Internet is the World Wide Web (WWW) which allows users to access text, graphics, audio and video resources which are stored on WWW servers. WWW servers use hyper text mark-up language (HTML), which is interpreted by browser programs run on client computers, in order to facilitate the display of and access to resources of various formats.

Conventionally, a WWW server communicates with the browser using Transmission Control Protocol (TCP) as a transport protocol, which ensures a reliable delivery of data. TCP provides reliable delivery of data by minimising errors in the transmitted data, assuring data delivery (and informing the sender in the case of delivery failure), endeavoring to deliver data in the correct sequence and eliminating duplication of delivered data (for further information regarding TCP, and related Internetworking protocols, see, for example. "IPing and the TCP/IP Protocols: Implementing the Next Generation Internet", Stephen A. Thomas, published by John Wiley & Sons.). Hypertext Transfer Protocol (HTTP) is the application protocol that controls the transfer of data between the WWW server and the WWW browser.

When downloading text resources, either plain text or HTML-formatted text, from a WWW server the browser is able to display chunks of text, as and when the chunks are received by the browser. For audio or video data resources, e.g. digitised music or video clips. It is normally necessary for the browser to download all of the audio or video resource before the resource can be played back by the user. As video and audio resources tend to be relatively large, e.g. a 45 second QuickTime movie requires 1.5 2.5 MB of storage (with the size depending upon the movie's resolution) and a 30 second audio clip in the .wav format (mono sound, 11 kB sampling frequency and 8 bit sampling) requires 300 kB of storage, the time taken to download them can be quite significant, leading to user dissatisfaction. One approach, when has been followed by RealNetworks with their RealPlayer and RealAudio products (see http://www.realnetworks.com), is to 'stream' the audio or video resource from the server to the user. 'Streaming' requires that the video or audio resource is encoded by the administrator of the WWW server and the encoded resource stored on the WWW server. This allows a user with a suitably configured browser to 'download' the resource, which is transmitted to the browser in a stream of packets which can be played back once a sufficient number of the packets are received by the browser. This becomes an unwieldy approach if there are a number of compacting coding protocols for audio and/or video resources as the resource would need to be encoded using each coding protocol which is an inefficient use of storage space on the WWW server and increases the amount of time required to manage the WWW server. For example, if the coding protocol were to be undated to a more advanced version it might be necessary to re-code all of the resources stored using the previous version of the coding protocol and all browsers would need to be upgraded to the include the new protocol in order to use the re-coded resources with the added features of the new protocol.

SUMMARY OF THE INVENTION

In accordance with a first aspect of the invention there is provided a method of transmitting data from a first server computer to a client computer, the method comprising the steps of transmitting the data from the first server computer to a second server computer in a first encoding format, transforming the data from said first encoding format to a second encoding format at the second server computer and transmitting the transformed data in said second encoding format to the client computer from the second server computer.

Preferably, the data is transmitted from the first server computer to the second server computer using a first transport protocol and the transformed data is transmitted from the second server computes to the client computer using a second transport protocol. The data may be transmitted by the first computer server to the second computer server using the Transport Control Protocol, the data is transformed by the second server and the transformed data is transmitted to the client computer using the User Diagram Protocol. The transforming performed by the second server computer may be determined by the content of a protocol downloaded to the second server computer from a third server computer. The first server computer may be a World Wide Web server.

According to a second aspect of the invention there is provided a dynamic proxy server computer located in a communications network such that it is in a communications route intermediate a server computer and a client computer, the dynamic proxy server computer being configured to receive data transmitted in a first data format from said server computer, to transform received data to a second data format from said first data format and to transmit the transformed data to the client computer in said second data format. Preferably, the transforming performed by the dynamic proxy server computer is determined by the content of a protocol downloaded from a third server computer. The dynamic proxy server computer may be configured to receive data transmitted from the server computer using a first transport protocol and to transmit the transformed data to the client computer using a second transport protocol. Preferably the data is transmitted by the first computer server to the dynamic proxy server computer using the Transport Control Protocol, the data is transformed by the dynamic proxy server computer and the transformed data is transmitted to the client computer using the User Diagram Protocol. The first server computer may be a World Wide Web server.

According to a third aspect of the invention there is provided a communications network comprising a World Wide Web server, a client computer and at least one dynamic proxy server computer, the dynamic proxy server computer being located between the World Wide Web serves and the client computer, the dynamic proxy server computer being arranged to transform data transmitted from the World Wide Web server to the client computer.

BRIEF DESCRIPTION OF THE DRAWINGS

Embodiments of the invention will now be described, by way of example only, with reference to the accompanying drawings in which.

DETAILED DESCRIPTION OF EXEMPLARY EMBODIMENTS

Figure 1:
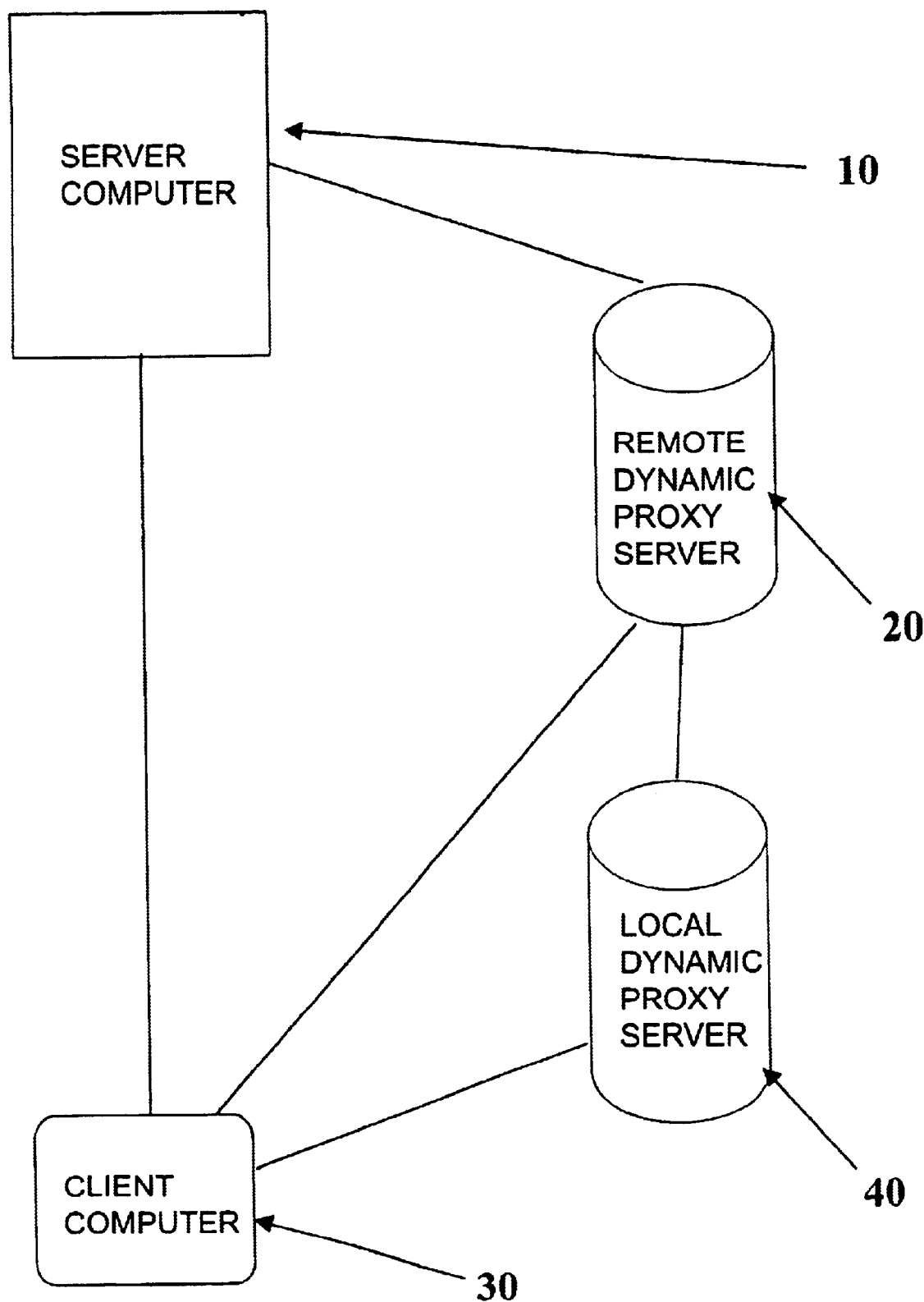
FIG. 1 shows a schematic depiction of a communication network including a dynamic proxy server according to the invention.

FIG. 1 shows a schematic depiction of a communication network including a server computer 10, a first, or remote, dynamic proxy server computer 20, a client computer 30 and a second, or local, dynamic proxy server computer 40. The communications network uses the Internet Protocol (IP) to control computer-to-computer communications and may be connected to the public Internet or be a part of an Intranet. Both of the dynamic proxy server computers 20 and 40 are located on a communications path between the server computer 10 and the client computer 30. The first dynamic proxy server computer 20 is located near to the server computer 10 and the second dynamic proxy server computer 40 is located near to the client computer 30. When the client computer 30 makes a connection with the server computer 10 in order to download data from the server computer, a data type identifier is transmitted to the second, or local dynamic proxy server computer 40. If the data type identifier matches one of the identifiers stored by a computer program, or proxylet, that is being run on the second dynamic proxy server computer 40, then a further proxylet is loaded onto the first dynamic proxy server 20 which prompts the server computer 10 to transmit the data resource to the first dynamic proxy server 20. The proxylet running on the first dynamic proxy server 20, upon receiving the data resources from the server 10, transforms the data resource being received from the server from a first protocol to a second protocol, the second protocol being one which allows the client 30 to access or execute the data resource more quickly or more efficiently than if the data resource had been directly downloaded from the server 10 to the client computer 30. The second proxylet may be stored on the dynamic proxy server or it may be downloaded from a further computer. For example, in the case of a video or audio data resource, the second protocol may be one which enables immediate playback of the data resource once the initial packets have been received by the client whilst the first protocol may be one that requires the entire data resources to be downloaded before the resource can be played back.

The dynamic proxy server (DPS) uses a number of proxylet programs, each proxylet performing a different data resource protocol transformation. (In Java computing, an 'applet' is a computer program that adds functionality to a browser application and a 'servlet' is a computer program that adds functionality to a server. Accordingly, a proxylet adds functionality to a dynamic proxy server.) In addition to transforming the protocol of the data resource, the proxylet may also change the transport protocol or application protocol used to transmit the data resource from the DPS to the client. This transforming may enable the use of an application protocol more suited to the type of data resource being transmitted (for example, for video or audio data resources, the use of the Real Time Protocol (RTP) rather than Hypertext Transfer Protocol (HTTP) and/or a transport protocol that provides faster data transfer at the expense of lower reliability (for example User Datagram Protocol (UDP) rather than Transmission Control Protocol (TCP).

The DPS accepts a simple set of requests from a range of clients or other DPSs in order to execute and manage proxylets. The server may request that the DPS loads a defined proxylet. A number of validation checks may be made following a 'Load' request, for example whether the server making the 'Load' request is authorised to do so. Service or content providers operating DPSs may only allow certain proxylets to be requested or loaded by a defined subset of servers or DPSs in order to control the quality of service provided by the DPSs. If the DPS has insufficient resource (e.g. memory, CPU time, network bandwidth, etc.) to run an additional proxylet then it may refuse the server's request to load the proxylet. In the event that the 'Load' request is acceptable then the DPS loads the proxylet by reference (i.e. a reference to the location of the proxylet is sent to the DPS for example, using a Uniform Resource Locator (URL) either from local storage or by downloading the proxylet from remote storage. As the proxylet is loaded by reference, the caching of recently used and frequently loaded proxylets is possible, so that further downloading may be unnecessary.

Once the DPS had loaded the proxylet it will be necessary to start the proxylet with the 'Run' request. In order to simplify the programming and management of proxylets it is possible that the proxylets have a generic form that would allow arguments to be supplied with the 'Run' request. For example, a proxylet which transforms the format of a data resource may require the identification of the startpoint and endpoint of the data resource and which transforming protocol to use. A 'Modify' request can be used to modify the state of a running proxylet, e.g. to change to a protocol with higher compression in response to low transmission bandwidth conditions. A 'Stop' request can be used to force the termination of proxylets that may not naturally terminate or have ceased to respond to the DPS. It will be necessary to restrict the actions which a proxylet is able to perform. For security reasons proxylets should not be able to access or modify files on the server, DPS or client. It may also be necessary to prevent connections being made to unauthorised clients or servers.

The DPS has a control interface to allow the operator and the users of the DPS to perform a number of control functions, for example: loading, or downloading, a proxylet; running a proxylet; passing new arguments to a running proxylet and stopping a running proxylet. The control interface allows the DPS provider to manage the operation of the DPS, and access to the full range of control Locations may be restricted for varying subsets of users, either because of security implications or because users have subscribed to packages offering different functionality or levels of service. It may be advantageous to separate the user functionality from the management functionality and provide separate control interfaces for both aspects of controlling the actions of the DPS.

It is envisaged that for large networks, such as the Internet or company Intranets, more than one DPS may be involved in an end-to-end communication and some mechanism will be required to locate suitable DPSs for use in an end-to-end communication. DPSs operated by a service provider will be provided with locators, such as URLs or network addresses, of other DPSs operated by the service provider, or other service providers with reciprocal use agreements, and may have the capability to search for further DPSs. Operators of WWW servers will have agreements with DPS operators, so that requests made at a WWW server that involves the use of a DPS can be transmitted to a suitable DPS.

Proxylets are control modules that are loaded by DPSs, either from local storage or from a remote library of proxylet, i.e. a Proxylet Server. A proxylet may be designed to be totally self-contained, comprising all of the code and protocols required in order to perform its defined functions, but alternatively it may download required protocols from Protocol Servers improving code reuse and simplifying the management of DPSs. Proxylets may have a control interface, allowing users to control the action of the proxylet and enter any required user parameters, preferred compression techniques, etc. For security reasons it may be preferred to restrict access to some of the proxylet's features for some or all users.

In order to reduce the complexity of the proxylets and simplify management of DPSs it is possible to remove transforming protocols and/or transport protocols from the proxylets and instead use a protocol stack, from which the proxylets obtain the necessary protocols. This means that a change in a protocol can be effected by modifying that protocol in the protocol stack rather than modifying all proxylets that use the protocol, in a similar manner to shared code libraries. The protocol stack may be held within local storage at the DPS or remotely on a Protocol Server, from which the proxylets can download protocols as required. If the client computer needs additional functionality in order to inter-operate with the DPS than the client computer may also download, a protocol from the Protocol Server. Alternatively, the DPS and the client may negotiate the protocol that is to be used during the data transfer, with a location reference (such as a URL) being passed to indicate the protocol to be used. The use of protocol stacks and Protocol Servers will simplify the control and management of a single protocol implementation by service providers. As discussed above, some form of caching on the DPS will enable faster access to those protocols that are used most often.

In the above discussion, a remote DPS 20 is provided 'near' to the server computer 10 and a local DPS 40 is provided 'near' to the client computer 30. The measure of how 'near' a DPS is to client the server computer or the client computer is not a geographical measure but is a measure of the bandwidth that is available between the DPS and either the client computer or the server computer relative to the bandwidth that is available between the client computer and the server computer. A 'near' DPS has a much higher bandwidth link to the relevant computer than is available between the client computer and the server computer, for example when downloading over the Internet, bandwidths of a few kB/s are typical for computers that are 'far' from each other (i.e. a client computer and a server computer) but computers that are 'near' to each other should have much higher bandwidths of hundreds of kB/s to a few MB/s and upwards, with the greater the bandwidth the nearer the two computers are to each other. Accordingly, DPSs should be connected to the same subnet or LAN as either the server computer or client computer in order to achieve significant benefit from the actions of the DPSs. Although FIG. 1 and the above discussion have assumed that two DPSs are used, if a DPS is sufficiently close to both the server computer and the client computer it is possible that the single DPS can be used to run all of the necessary proxylets and provide all of the functionality previously provided by both DPSs.

Figure 2:
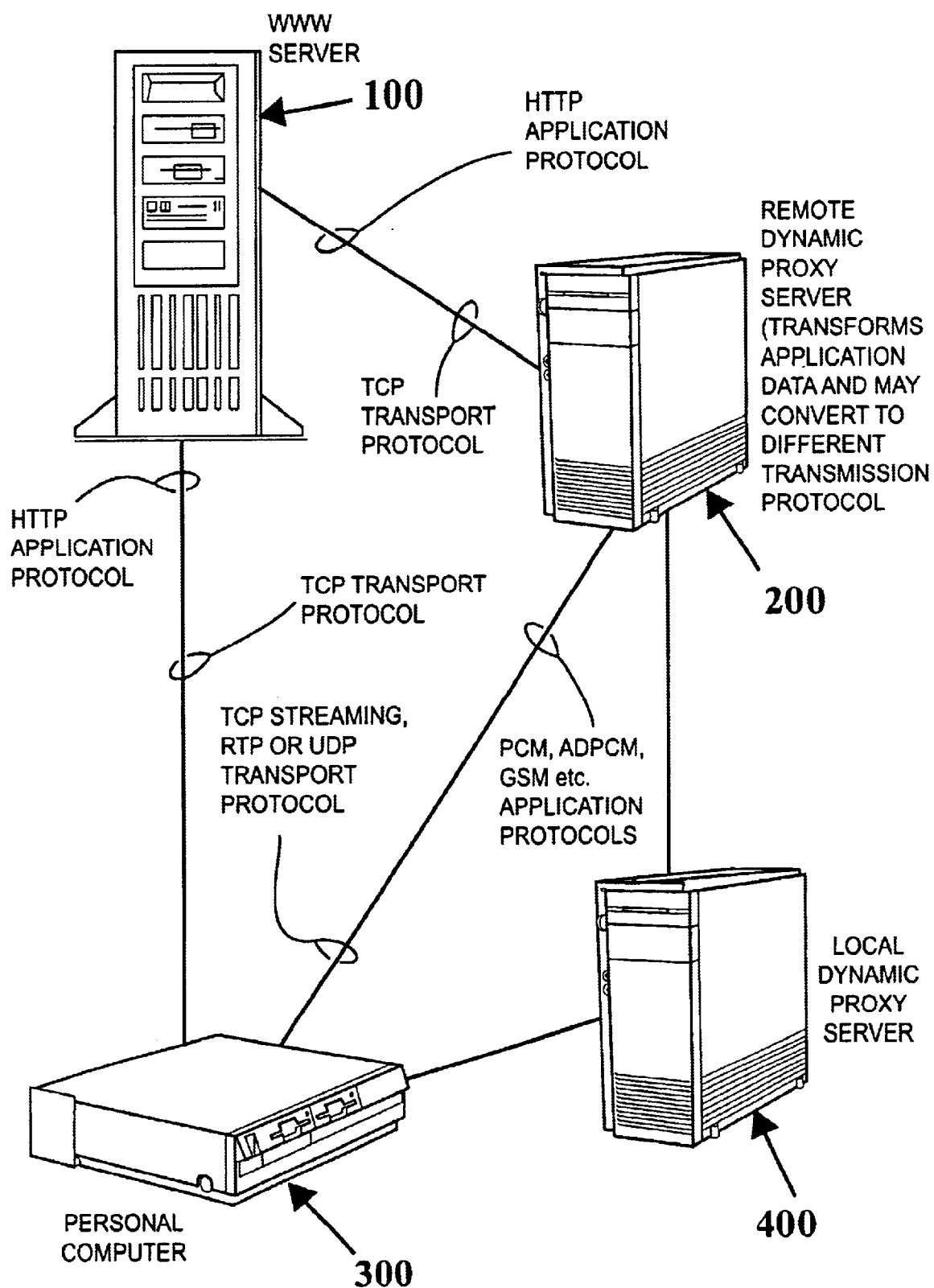
FIG. 2 shows a schematic representation of a preferred embodiment of a communication network including a dynamic proxy server according to the invention.

FIG. 2 shows a preferred embodiment of the present invention where a WWW server computer 100, a remote dynamic proxy server (DPS) computer 200, a personal computer (PC) 300 and a local dynamic proxy server 400 are interconnected via the Internet. In order to access the information held on the WWW server 100, the PC 300 is running an Internet browser program, such as Netscape Navigator or Microsoft Explorer. The WWW server 100 stores a number of different data resources, including an audio data resource, which has been digitised using pulse code modulation (PCM). Most WWW browsers can be configured so that interactions are performed through a local cache: if the requested site's URL is held in the local cache it is returned from the cache while if the URL is not present in the cache then it is retrieved from the remote site and the URL is added to the cache, if it is of a suitable type, for future retrieval from the cache. The browser's setting that points to a cache is normally called the proxy variable. The WWW browser running on PC 300 is configured so that its proxy variable is pointing to a webcache proxylet being run on the local DPS 400. This webcache proxylet does not perform any caching but is in the communication path between the browser and the WWW server 100 so that it can view any HTTP requests that are made by the browser. When a browser makes a request to a WWW server, the returned stream of data is preceded by a MIME (Multipurpose Internet Mail Extension) identifier that identifies the content of the data stream and which is used by the browser to correctly respond to the incoming data stream. Common MIME identifiers are 'texthtml' which the browser displays as plain text and 'audio/basic', which causes the browser to download all of the content of the data stream into a file and then playback the file using a 'helper' program that can deal with audio files. The webcache proxylet contains a table of MIME identifiers for which the remote DPS 200 can add value by transforming the data format and because of the configuration of the proxy variable is able to observe the MIME identifiers being passed from WWW server to browser.

If the Internet browser is used to download the audio sample from the WWW server 100, the WWW server ends a response to the browser that is preceded by a MIME of audio/basic. This is recognised by the webcache proxylet, which then causes the remote DPS 200 to load a suitable proxylet to transform the audio data. The communication between the PC and the WWW server (and between the WWW server and the remote DPS) uses HTTP as the application protocol and TCP as the transport protocol, as is normal when using the Internet. The proxylet loaded by the remote DPS 200 is selected as it is capable of receiving data transmitted using HTTP/TCP and can transmit data to the PC using application and transport protocols that are supported by the Internet browser, such as RTP and UDP. Additionally, the proxylet may transmit the audio data in the PCM format, or transform the audio data into a different modulation scheme, such as, for example, adaptive delta pulse code modulation (ADPCM) or the GSM audio protocol, that is supported by the Internet browser or an associated 'helper' program. The proxylet receives the 'Run' request, along with information regarding the location of the audio data and the audio playback program.

As the WWW browser will not be expecting a data stream using different application and/or transport protocols, the webcache proxylet may send a new MIME identifier to the browser that will cause a suitably configured audio 'helper' program to be started to playback the stream of audio data. The disadvantage of this method is that the browser and the helper must be suitably configured. Alternatively, the webcache proxylet may send a URL redirect to the WWW browser, sending the browser to a WWW page, which may be hosted on the local DPS 400, which contains an applet that provides the necessary audio playback functionality.

The disadvantage of this method is that the browser must be able to run applets, but this is less of a disadvantage than the pre configuration of the browser.

There are essentially three methods of transmitting the audio data to the PC; TCP downloading, TCP streaming and RTP streaming. A TCP download (which is the normal case when using an Internet browser) involves making a TCP connection and downloading the entirety of the audio data, after which the audio data can be played. A delay is incurred while the file is downloading but the audio quality is preserved. When TCP streaming is used, a TCP connection is made between the DPS and the PC to download the audio sample. The audio playback is started once a bullet of audio data has been gathered. The advantage of TCP streaming over TCP download is that the user can start to listen to the audio sooner. However, the features of TCP that increase the reliability of the protocol will affect the supply of audio data to the buffer. If packets are lost, or badly delayed, between the DPS and the PC then those packets will be re-transmitted, leading to further delay in the arrival of the 'correct' packets, in sequence, at the PC. If data packets are not being received by the PC at the same rate at which the data is being taken from the buffer and played back then the buffer will begin to empty and once the buffer is empty there is no audio data to be played, so periods of silence will occur until packets arrive at the receiver again. The larger the buffer size, the less of a problem this becomes, however with increased buffer size comes an increased time to fill the buffer before audio playback can occur. TCP streaming enables faster audio playback than TCP download, but with the risk of decreased sound quality. The third option is Real Time Protocol (RTP) streaming (for detailed information regarding ATP see, for example, Chapter 11 of "IPng and the TCP/IP Protocols: Implementing the Next Generation Internet". Stephen A. Thomas, published by John Wiley & Sons). RTP has been designed to support the transmission of real-time data over IP networks by modifying the strict layering of protocols to provide a more co-operative approach, which is referred to as application layer framing (ALF). Real time applications tend to have mechanisms that allow them to cope with missing packets or packets arriving in an out of order sequence, for example some audio playback tools cope better with missing packets rather than packets that are heavily delayed due to retransmission delays. These factors mean that the additional complexity provided by TCP is not necessary with RTP and so the User Datagram Protocol (UDP) can be used as the transport protocol. UDP delivers a datagram (a unit of data) to a particular application in a connection-less manner, i.e. each diagram is independent of all other datagrams, there is no way in which multiple datagrams can be referenced to each other, there is no mechanism by which the receipt of a datagram can be acknowledged to the diagram sender and there is no way that a stream of datagrams can be placed into a correct order. This lack of complexity assumes that application protocol is capable of re-ordering packets and coping with packet loss.

An experiment was performed in which an audio sample was placed on a WWW server in the United Kingdom and a DPS was also created in the UK, on the same Ethernet segment as the WWW server containing the audio sample. The WWW server and the DPS were located near to each other in order to lessen the round trip time between them and to reduce the possibility of a bandwidth bottleneck occurring between them. The audio sample was four minutes long and had been encoded using PCM. Downloading the audio sample from Sydney, Australia with a normal WWW browser took eight to ten minutes, which is a substantial wait before the audio sample can be played back by the user. A proxylet was written which enabled the audio sample to be transmitted using RTP rather than TCP and also enabled the encoding of the audio sample to be changed from PCM to ADPCM or LPC (Linear Predictive Coding). The proxylet was written using the Java programming language, and the Remote Method Invocation (RMI) mechanism was used to interact with the DPS. The use of Java is not essential for writing proxylets and neither is the use of RMI for DPS interaction. It will be understood that alternative programming languages (e.g. C ++) and other distributed computing control methods (e.g. CORBA, DCOM) may be used. For this experiment a control interface was written which could be used to communicate with the DPS. The control interface enables the loading of the proxylet by the DPS and allows the user to change the encoding used or otherwise modify the audio packets as they are sent. In practice it may be undesirable for users to have too much access to the DPS and thus access to the control functions of the interface may be restricted to the service provider who provides the DPS. The proxylet is given the location to the audio sample on the WWW server, in the form of a URL, and the location of the playback tool on the user's client computer. As soon as the proxylet is loaded and run by the DPS it starts to transform the audio sample and transmit it to the playback tool, via the WWW browser. The audio is received by, and played back to, the user almost immediately. The user can select the transforming scheme used by the proxylet from PCM, ADPCM and LPC. ADPCM gives greater data compression than PCM, allowing the audio data to be transmitted as an ADPCM stream using half the bandwidth of a PCM stream. Switching to ADPCM did not cause a perceivable change in the quality of the received audio. The user may also change the size of the audio sample from the default value of 20 ms (which also changes the size of the transmitted packet), add redundancy into the transmitted packets and control the response of the playback tool when the audio buffer is empty. The addition of redundancy adds to the current packet all, or some, of one or more of the previous packets transmitted, which will improve audio quality over lossy links. In the event of repeated packet transmission the audio buffer will become empty. If this situation does occur that the previous audio sample is repeated rather than insert a 20 ms silence. This repetition greatly enhances the quality of the audio playback.

The main reason for using Java when building the DPS and proxylets is that Java programs can be compiled into platform independent byte code which is then interpreted on a Java Virtual Machine. Java Virtual Machine (VMs) exist for most commonly used architectures, such as Windows 95, Windows NT, Macintosh, UNIX, etc. Therefore the proxylets and components of the system are not limited to one particular machine architecture or operating system. In the context of proxylets another important feature of the Java system is that support for security is built into the environment. It is therefore possible to configure the DPSs such that the proxylets may not perform actions which are considered to be insecure, such as to access or modify local files. Other computer languages, such as C ++, may be used to build proxylets but this will necessitate the proxylets being recompiled in order to use the proxylets on different platforms. If other computer languages do not have similar inbuilt security features as Java, then it will be necessary to add in sufficient security mechanisms when building the proxylets.

Each proxylet may be run within its own Java VM, to simplify the operation of the proxylets, or a number of proxylets may be run within a single Java VM. An advantage of using one VM per proxylet is that if it is necessary to stop a proxylet, this may be achieved by terminating the corresponding VM. If a number of proxylets are sharing a single VM then all of the threads belonging to the proxylet which is to be stopped must be identified and then terminated. There are some circumstances, e.g. when waiting for data from the network, when a thread can not be terminated. Another advantage of using one VM per proxylet is that proxylets may be able to interfere with other proxylets, either inadvertently or maliciously, running in the same VM.

One disadvantage of this approach is that the Java byte code must be interpreted by the Java VM running on the intended platform and this will obviously be slower then executing native code on the platform. This may have repercussions for proxylets being executed on Java VMs, especially when transforming audio or video data. An experiment was performed with two Sun Ultra 1 machines, both running Solaris 2.5.1, which were on the same Internet subnet. One machine hosted the WWW server and the DPS, whilst the other hosted the DPS control interface and the audio playback program. The test sample was three minutes long and had been encoded using PCM. The main computational concern was whether an audio sample could be coded or decoded in less time than the duration of the sample, with a minimum sample duration of 20 ms. The transforming of a 20 ms sample from PCM to ADPCM took approximately 1–2 ms and even when the proxylet was adding two levels of redundancy (i.e. adding the two previous samples to the current sample) the transforming to ADPCM took approximately 4–5 ms. Thus, the transmission of a 20 ms sample with two levels of redundancy, which included the time taken to transform and packetise the data was approximately 5 ms, which is significantly less than the maximum allowable time of 20 ms. This shows that the Java VM is clearly suitable for operating proxylets and DPSs.

In a second embodiment of the invention, a proxylet was built that compresses text, in an analogous manner to the re-coding of the audio data. When a browser downloads text from a WWW browser, the webcache proxylet running on a local DPS will receive a MIME identifier of 'text/html', which causes the compression proxylet to be run on a remote DPS near to the WWW server in order to compress the text before it is transmitted to the browser. The local DPS will then load a decompression proxylet which decompresses the stream of text received from the remote DPS. The uncompressed text is then sent to the browser using HTTP. The actions of the webcache proxylet mean that the compression (and subsequent decompression) of the text is independent of and transparent to the operation of the WWW server and the browser. For congested or low bandwidth links, the use of the compression proxylet increases the performance of HTTP connections. Similar compression proxylets can be built for different data resource types.

It is known that the path that is chosen by routing protocols between the two end-points of a communications link is not always the path with the lowest latency or highest transmission performance. It has been found, for example, that the direct network path between Sophia Antipolis, France and Sydney, Australia is of a very poor quality and that more efficient communications can be achieved by first directing packets to a server in London and then re-directing them to Sydney. A third embodiment of the invention has been developed to address this issue. A TCP bridge proxylet has been written which accepts connections on a certain port and then makes a connection to a port on another host. All packets in both directions are transmitted through the TCP bridge proxylet, providing application level routing. In the example given above, the user in France would make a request to a DPS in London for another location which was known to provide more effective end-to-end communication) to load the ICP bridge proxylet and enter the details (e.g. network address and port number, or URL) of the destination host or server to run the proxylet. The proxylet isolates troublesome segments of networks using dedicated TCP connections, which prevents known problems that can occur when using end-to-end connection and/or congestion controls(s).

Figure 3:
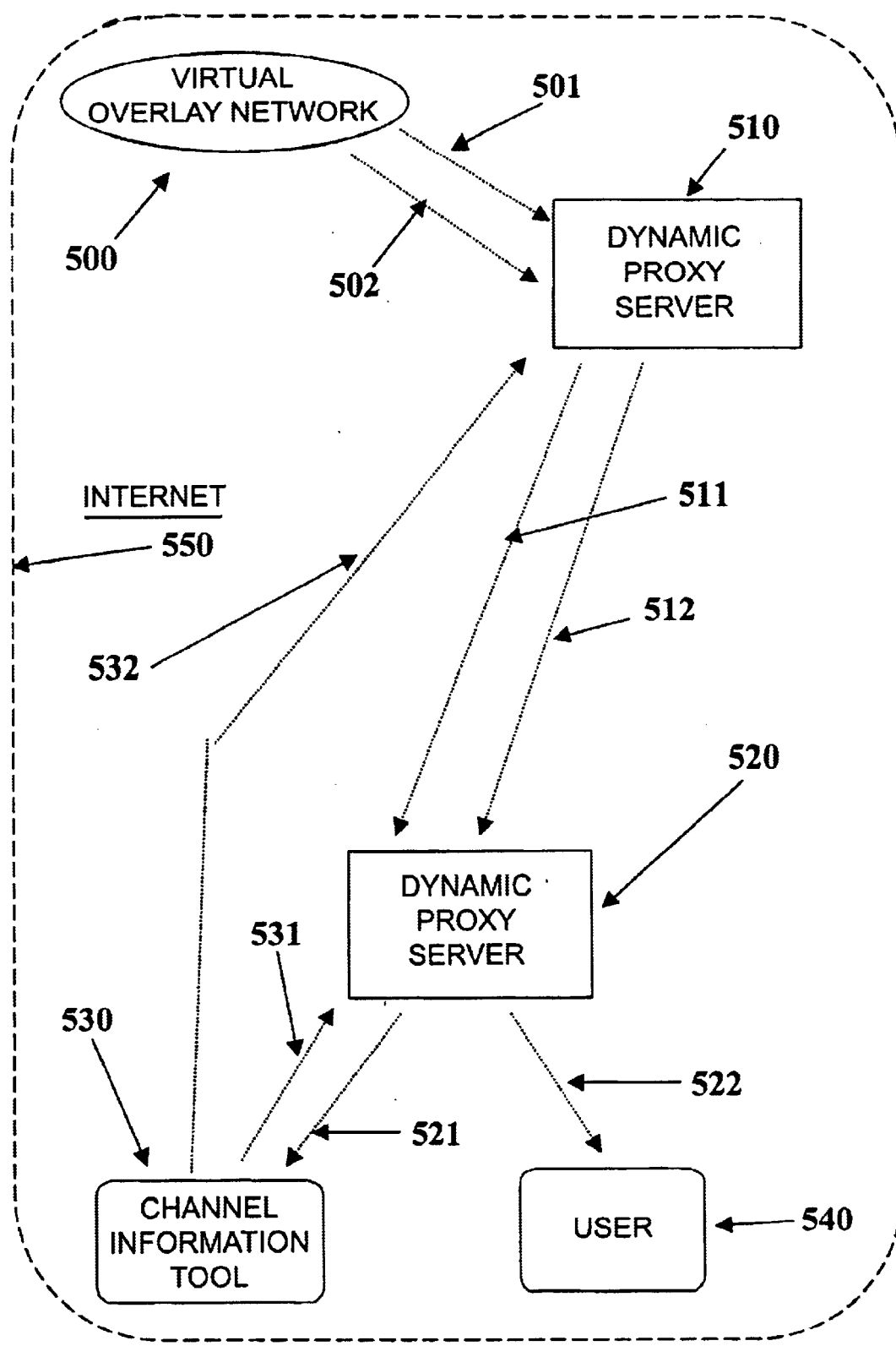
FIG. 3 shows a schematic representation of a further embodiment of a communication network including a dynamic proxy server according to the invention.

A fourth embodiment of the invention is shown in FIG. 3. The Internet 550 interconnects a first DPS 510 and a second DPS 520. The first DPS 510 is able to connect to a virtual overlay network 500 which is carried over the Internet. The virtual overlay network is designed to carry high-bandwidth multimedia and/or real-time applications, such as audio or video multicasts and broadcasts. Users who connect to the same subnet as the first DPS 510 are able to receive such transmissions, but those users who connect to the same subnet as the second DPS 520 are not able to receive those transmissions. The transmissions comprise a number of different channels, some of which are information channel (s) 501 whilst the other channels contain the broadcast or multicast content, which can be transmitted as a number of parallel sessions. Users run a software tool on their client computers to receive and decode the information channels and then prompt a suitable audio or video tool to play a selected broadcast (or multicast) content channel.

In order to allow users who connect to the same host as the second DPS 520 to receive the multicast channels a 'reflector' proxylet is run on the first DPS 510 that reflects the information channels 501 to the second DPS 520. The reflected information channels 511 are transmitted across the Internet 550 to the second DPS 520. The second DPS 520 is running a similar 'reflector' proxylet that reflects the information channels on to local users. The twice reflected information channels 521 can be received by local users who are running a suitable channel information tool 530 on their client computers. If a user, having received the information channels 521, wishes to receive one of the content channels from the virtual overlay network 500 then the channel information tool 530 can prompt the first DPS 510 to run a further proxylet to reflect the selected content channel(s) 512 to the second DPS 520 over the Internet. In turn, the second DPS 520 runs a similar proxylet that reflects the content channel(s) 522 to those users who have selected to receive the various content channel(s). The content channels are decoded using a suitable audio or video playback tool, depending upon the format of the channel. When the information channels are reflected across the Internet 512 & 522, they may be compressed, or some form of streaming used, to improve the quality of reception.

An example of such a virtual overlay network is the multicast backbone, or MBone. The multicasting channels, or sessions may be controlled by a protocol such as the session description protocol (SDP) (see "SDP: Session Description Protocol", RFC 2327, M. Handley, V. Jacobson, Apr. 14, 1998). This embodiment enables users who can not connect directly to the MBone, or similar virtual overlay networks to 'tunnel' to the MBone in order to receive applications that would not otherwise be available to them.

A potential drawback is the overhead involved in using DPSs and proxylets. Consider the case of the example where an audio sample is downloaded from the UK to Australia but the audio proxylet is located in Australia and is larger than the audio sample (this is very much a worst case scenario).

If the audio proxylet is not cached by the DPS in the UK, then the downloading of the proxylet will take longer than the transfer of the audio file to Australia and the overhead of the DPS will be larger than any benefit gained from its use. In order to gauge the overheads involved with DPSs an experiment was performed using the webcache proxylet, which was running on a DPS on the same subnet as a target WWW server. The webcache proxylet, in response to a WWW browser request, downloads the compression proxylet (see above), which retrieves a URL from the WWW server, compresses the text contents (using the GZP compression algorithm) and delivers the compressed stream to the webcache proxylet. The webcache proxylet decompresses the data stream and delivers the decompressed data stream to the WWW browser. The two files used in the experiment contained the text of the King James Bible (5073934 bytes) and a single text byte. (In order to simplify the timing of the processes and to remove the overheads of a browser, a small Java program was written which could retrieve the contents of a URL). The experiment was performed on a 10 Mb/s switched Ethernet and was performed twenty times to gain average times for retrieving each file. The average times for retrieving each file with and without proxylets are shown below in Table 1:

TABLE 1

File Retrieval Times

| Size of File (Bytes) | Retrieval Time (No proxylets) | Retrieval Time (Compression Proxylet) |
| --- | --- | --- |
| 1 | 2.6 s | 5.7 s |
| 5073934 | 20.12 s | 21.52 s |

The results of Table 1 show that the overhead with the single byte file was approximately 3 seconds and the overhead for the large file was approximately 1 second. The compression proxylet might have been expected to deliver positive benefit, but the compression time for the larger file was 10.09 s, which was a speed of approximately 4 Mb/s. As this was slower than the network bandwidth, the compression became the system feedback. A faster compression algorithm would be required to deliver a benefit on this network, but for the slower speeds which are common on the Internet (typically tens of kb/s rather than a few Mb/s) the use of the compression proxylet would be beneficial.

DPSs and Protocol Servers are, in effect, repositories of code which will be executed at another location. For this reason WWW servers may be used rather than building special purpose servers. The Universal Resource Locator (URL) gives a globally unique way of identifying a code object, which is sufficient for the requirements of DPSs and Protocol Servers. The Protocol Servers have similar advantages to shared code libraries. One copy of a code library is used by all applications on a system and if a modification is made to the code library then only the code library needs to be replaced, rather than all of the applications. Using the Protocol Server model it may be possible to have a single implementation of a certain protocol, such as RTP, available from a service provider. If the Protocol Servers adhere to a standard set of APIs then system builders will be able to use off the shelf components when building systems. This attempt to foster code reuse should enable systems to be built more quickly from existing software components.

A further possibility for choosing a protocol for use when communicating between a DPS and a browser is that the browser and the DPS may negotiate the choice of a protocol. This negotiation process may involve the DPS (or the client) communicating a reference to the protocol stack it is using to the client (or the DPS).

In the embodiment discussed above, the DPS executes proxylets on behalf of the user, with the DPS being selected by the user who is aware of its location. It is possible that a very large number of DPSs will become a part of the Internet, with more than one DPS assisting in an end-to-end communication path. As the number of DPSs increase it will not feasible for users to be aware of the location and functionality of all of the different DPSs, so it is expected that the DPSs will know of each others existence, and DPSs will be discovered in an automated manner. A user wishing to make use of one or more DPSs will make a request for a DPS close to either the user or the target WWW server. Considering the example discussed above of an audio sample on a WWW server in the UK, then the nearest DPS with the correct functionality to that WWW server will be discovered and used. A possible solution is to have all the DPSs co-operating in a mesh, with all requests being directed to a local DPS which then relays requests to the appropriate DPS. Appropriateness may simply be a function of load, location or supported functionality. For certain communications it may be appropriate to chain together a number of DPSs. For example, it may be possible to force the routing of traffic through lightly loaded parts of the Internet by using a set of DPSs so that a mesh of co-operating DPSs may be able to determine a high bandwidth route between two points.

It is envisaged that DPSs will be provided by service providers and/or content providers and that their customers will gain access to DPSs as a part of a service package.

The DPSs have a control interface which allows users to connect to them in order to perform a number of control functions, including causing a proxylet to be loaded, starting the running of a proxylet, modifying a running proxylet, and stopping the operation of a proxylet. It may be advisable for operators of DPSs to deny access to some features of the control interface for users in order to maintain the security of the network and the DPS. The Dynamic Proxy Server may itself perform a number of validation checks, such as only allowing proxylets from trusted sources to be loaded and run, only downloading proxylets or protocols from certain locations or only allowing use by a set of registered users or from certain WWW servers. It may not allow a proxylet to be downloaded if the Dynamic Proxy Servers is currently too heavily loaded due to the servicing of other requests. This provides a mechanism by which management policies and decisions can be implemented on the DPS.

A proxylet is code which is downloaded and executed by a DPS. In the Java implementation, a proxylet takes the form of a collection of class files (a class file is produced from the Java compilation process). The class files contain platform independent byte codes and are bundled together in single Java archives (Jar files). Each proxylet is constituted by a single Jar file. In order to maximise the flexibility of operation of the proxylets, each proxylet is allowed access to all of the classes, and hence all of the functionality, available in the Java Development Kit (JDK).

A proxylet can contain all the code required to do any protocol processing and transforming. If appropriate, the initially downloaded proxylet may contain only the control components, and may download dynamic protocol code from the DPS of a Protocol Server. The DPSs and end systems may negotiate with each other in order to find the location of the protocol to use in a communication. In order to increase the possibility interoperability all the Dynamic Proxy Servers and end systems in a communication may use the same protocol stack from the same Protocol Server.

A very significant aspect of the DPS is secure and safe operation. To prevent hostile proxylets being downloaded onto the DPS and to prevent proxylets inadvertently performing hostile acts, integrity checks will need to be performed. A set of checks will decide if a proxylet can or can not be downloaded, whether for security reasons or because sufficient resources are not currently available on the DPS. It may also be necessary to restrict the actions which a proxylet performs. For example, it is not expected that a proxylet should access or modify files on the DPS or WWW server on which it is running. It may also be necessary to restrict where network connections are made. When implementing proxylets in Java, it is possible to add a digital signature to a Jar file (used to build a proxylet) in order to allow proxylets to be run by DPSs or to allow certain proxylets to perform acts that normally are forbidden.

It is expected that proxylets and protocols will be used frequently so it may be important that the Dynamic Proxy Servers and protocol servers include mechanism to cache frequently used programs in order to cut down on undue network traffic. The use of WWW servers as repositories of proxylets and protocols make caching extremely simple to implement as existing WWW caching schemes can be used.

What is claimed is:

1. A method of transmitting data from a first server computer to a client computer via a computer network, the method comprising:

requesting a dynamic proxy server computer to run a proxylet for transforming data, which proxylet is referred to by an address within a data store connected to the computer network from where the proxylet is available for dynamic downloading by proxy server computers connected to the computer network;

requesting the first server computer to transmit the data to said dynamic proxy server computer;

transmitting data from the first server computer to the dynamic proxy server computer in a first encoding format;

transforming said data from said first encoding format to a second encoding format at the dynamic proxy server computer utilizing the proxylet dynamically downloaded to the dynamic proxy server computer without substantially changing the information content of said data; and transmitting the transformed said data in said second encoding format to the client computer from the dynamic proxy server computer.

2. A method as in claim 1, wherein:

said data is transmitted from the first server computer to the dynamic proxy server computer using a first transport protocol and the transformed data is transmitted from the dynamic proxy server computer to the client computer using a second transport protocol.

3. A method as in claim 1, wherein:

the first server computer is a World Wide Web server.

4. A method of transmitting data from a first server computer to a client computer, the method comprising:

transmitting data from the first server computer to a second server computer in a first encoding format, transforming said data from said first encoding format to a second encoding format at the second server computer without substantially changing the information content of said data; and transmitting the transformed said data in said second encoding format to the client computer from the second server computer;

wherein said data is transmitted from the first server computer to the second server computer using a first transport protocol and the transformed data is transmitted from the second server computer to the client computer using a second transport protocol; and wherein said data is transmitted by the first computer server to the second computer server using Transport Control Protocol, the data is transformed by the second server and the transformed data is transmitted to the client computer using User Datagram Protocol.

5. A method of transmitting data from a first server computer to a client computer via a computer network, the method comprising:

requesting a dynamic proxy server computer to run a proxylet for transforming data, which proxylet is referred to by an address within a data store connected to the computer network from where the proxylet is available for dynamic downloading by proxy server computers connected to the computer network;

requesting the first server computer to transmit the data to said dynamic proxy server computer;

transmitting data from the first server computer to the dynamic proxy server computer in a first encoding format;

transforming said data from said first encoding format to a second encoding format at the dynamic proxy server computer without substantially changing the information content of said data; and transmitting the transformed said data in said second encoding format to the client computer from the dynamic proxy server computer;

the transforming performed by the dynamic proxy server computer is determined by the content of a protocol of the proxylet dynamically downloaded to the dynamic proxy server computer from a third server computer.

6. A dynamic proxy server computer, said dynamic proxy server computer being located in a computer network such that it is in a communications route intermediate a server computer and a client computer, said dynamic proxy server computer being configured to run a proxylet for transforming data, which proxylet is referred to by an address within a data store connected to the computer network from where the proxylet is available for dynamic downloading by proxy server computers connected to the computer network;

the dynamic proxy server computer being configured to receive data transmitted in a first data format from said server computer, to transform received data to a second data format from said first data format utilizing the dynamically downloaded proxylet without substantially changing the information content of said data and to transmit the transformed said data to the client computer in said second data format.

7. A dynamic proxy server computer as in claim 6 wherein the first server computer is a World Wide Web server.

8. A dynamic proxy server computer, said dynamic proxy server computer being located in a computer network such that it is in a communications route intermediate a server computer and a client computer, said dynamic proxy server computer being configured to run a proxylet for transforming data, which proxylet is referred to by an address within a data store connected to the computer network from where the proxylet is available for dynamic downloading by proxy server computes connected to the computer network;

the dynamic proxy server computer being configured to receive data transmitted in a first data format from said server computer, to transform received data to a second data format from said first data format utilizing the dynamically downloaded proxylet without substantially changing the information content of said data and to transmit the transformed said data to the client computer in said second data format;

the transformed performed by the dynamic proxy server computer is determined by the content of a protocol of the proxylet, the proxylet being dynamically downloaded from a third server computer.

9. A dynamic proxy server computer as in claim 8, wherein:

the dynamic proxy server computer is configured to receive data transmitted from the server computer using a first transport protocol and to transmit the transformed data to the client computer using a second transport protocol.

10. A dynamic proxy server computer, said dynamic proxy server computer being located in a communications network such that it is in a communications route intermediate a server computer and a client computer, the dynamic proxy server computer being configured to receive data transmitted in a first data format from said server computer, to transform received data to a second data format from said first data format without substantially changing the information content of said data to transmit the transformed said data to the client computer in said second data format;

wherein the transforming performed by the dynamic proxy server computer is determined by the content of a protocol downloaded from a third server computer;

wherein the dynamic proxy server computer is configured to receive data transmitted from the server computer using a first transport protocol and to transmit the transformed data to the client computer using a second transport protocol; and wherein the data is transmitted by the first computer server to the dynamic proxy server computer using Transport Control Protocol, the data is transformed by the dynamic proxy server computer and the transformed data is transmitted to the client computer using User Datagram Protocol.

11. A computer network comprising:

a World Wide Web server, a client computer, and at least one dynamic proxy server computer, the dynamic proxy server computer being located between the World Wide Web server and the client computer, said dynamic proxy server computer being configured to run a proxylet for transforming data, which proxylet is referred to by an address within a data store connected to the computer network from where the proxylet is available for dynamically downloading by proxy server computers connected to the computer network;

the dynamic proxy server computer being arranged to transform data transmitted from the World Wide Web server to the client computer from one format to another using the dynamically downloaded proxylet without substantially changing the information content of said data.

* * * * *